Sept. 1, 1936.  M. V. WUILLOT  2,053,058
SEPARATOR FOR ELECTRIC ACCUMULATORS
Filed Feb. 27, 1932
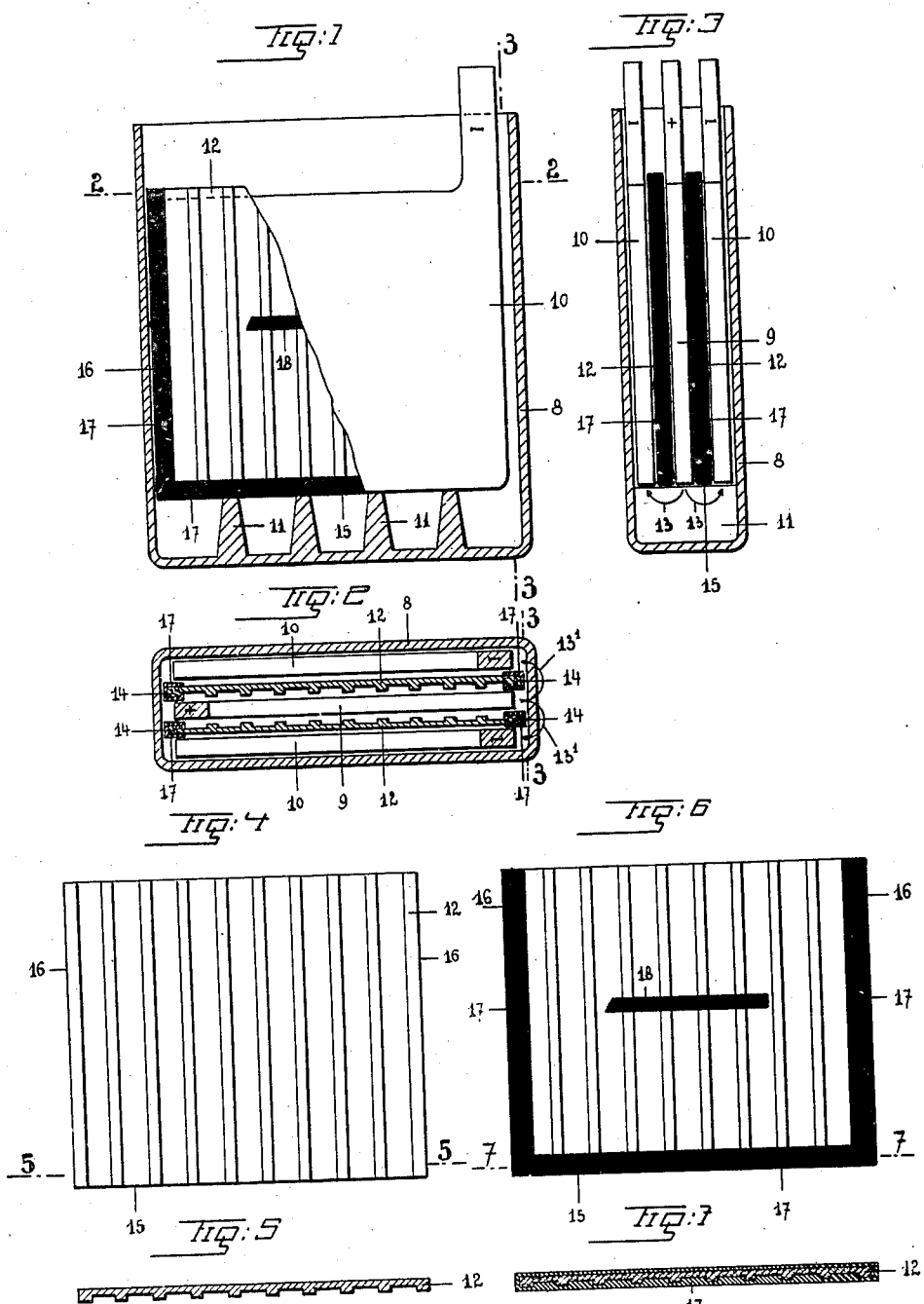
INVENTOR
MARCEL VICTOR WUILLOT
BY
Victor D. Borst
ATTORNEY Patented Sept. 1, 1936

2,053,058

UNITED STATES PATENT OFFICE 2,053,058

SEPARATOR FOR ELECTRIC ACCUMULATORS

Marcel Victor Wuillot, Brussels, Belgium, assignor to "Compagnie Belge d'Accumulateurs dite Cebea", societe anonyme, Brussels, Belgium Application February 27, 1932, Serial No. 595,497
In Belgium February 27, 1931

1 Claim. (Cl. 136—150)

My invention relates to wood separators as used in the cells of storage batteries between the plates.

One object of my invention is to reinforce the said separators in their most exposed parts and more particularly in their lower edges by which they rest directly on the bottom projections of the accumulator box and in the side edges projecting relatively to the plates so as to form a kind of baffle between the said plates.

A further object of my invention is to prevent the slow disintegration of the separators at these critical places under the action of the more or less concentrated electrolyte when they are formed for instance of an organic material which is more or less liable to be attacked by this electrolyte.

With these objects in view my invention essentially consists in the special combinations and arrangements of parts which will be hereinafter fully described and pointed out in the appended claim.

Referring to the annexed drawing, which shows as an example one embodiment of my invention:

Fig. 1 is a partial vertical and longitudinal section taken through a storage cell provided with separators constructed according to my invention.

Fig. 2 is a horizontal section taken on line 2—2 in Fig. 1.

Fig. 3 is a vertical transverse section taken on line 3—3 in Figs. 1 and 2.

Fig. 4 and Fig. 5 show respectively in front elevation and horizontal section taken on line 5—5 in Fig. 4 a wood separator of ordinary construction as generally used in storage cells of the kind shown in Figs. 1 to 3.

Figs. 6 and 7 are two views similar to Figs. 4 and 5 of a wood separator constructed according to my invention and as used in the cell shown in Figs. 1 to 3, Fig. 7 corresponding to a horizontal section taken on line 7—7 in Fig. 6.

In Figs. 1 to 3, 8 is a cell box containing a positive plate 9 and two negative plates 10; the said plates rest on the bottom projections 11 of the box and are separated by aid of the bodies of separators 12 resting also on the projections 11 in such a manner that the shortest electrical path between the plates having different polarities is at the level of the lower edges of the plates and separators as shown by the arrows 13 (Fig. 3. The side edges of the separators 12 project somewhat beyond the side edges of the plates 9—10 so as to form a kind of little baffle 14 (Fig. 2) which is reduced so much as possible to avoid encumbering, thus creating also at this place a very short electrical path between the plates as shown by the arrows 13' (Fig. 2).

According to my invention, in order to reinforce the bodies of the wood separators in their most exposed parts, the said wood separators are embedded at the said parts only in a suitable acid resisting material intimately amalgamated with them as it will hereafter appear.

As an example the usual wooden separator 12 shown separately in Figs. 4 and 5 is embedded according to my invention along its lower edge 15 and also along its side edges 16 with a material 17 adapted to resist the destructive action of the electrolyte; also special zones 18, which it may be desirable to protect against the action of the electrolyte may be coated or otherwise protected with the same material.

The imbedding and the resulting coating or impregnating is obtained by dipping the edges of the wood separators in their ordinary wet condition into a hot bath of asphalt or paraffin or any anti-acid compound. The material or compound used will be of such a nature as to be able of hardening when cooling or drying.

The said material 17, which amalgamates with the body of the separators, reinforces their edges, impregnating them and filling their pores as shown by dots in Fig. 7. In fact, during the dipping of the wet wood separator in the bath of hot asphalt, the water is vaporized during the hot treatment and the imbedding or coating material takes the place of the water in the pores of the wood.

Obviously the scope of my invention is not restricted to the example as above described as the coating is not only applicable to the edges of the separators but may also be applied to ribs or certain parts of a separator so as to secure a reinforced spacing of the plates of different polarities, while consolidating the separator frame. Similarly, if it is only necessary to maintain a stable spacing, it may be sufficient to impregnate the edges of the separators, without coating or imbedding so as to only protect the said edges against disintegration.

I am aware that it has already been suggested to remedy the inconveniences of separators now in use by reinforcing mechanically perforated separators along the edges by solid or unperforated zones and by applying separate strengthening frames made of anti-acid materials to separators forming diaphragms more or less liable to be attacked by the electrolyte. Further that it has also been suggested to impregnate separators consisting of a porous fabric with a melted mineral hydrocarbon which, when becoming cold, binds together the fibers of the specially prepared separator. Consequently I do not claim such arrangements but what I claim is:

The process of impregnating the lower and side edges of a wet wood body separator for electric accumulators which process comprises a thorough penetrating and reinforcing coating of asphalt along the said edges, the said coating being obtained by dipping the said edges into a bath of hot asphalt which takes the place of the vaporized water in the pores of the wood.

MARCEL VICTOR WUILLOT.